United States Patent Office 3,104,233
Patented Sept. 17, 1963

3,104,233
PROCESS FOR COLORING HIGH MELTING ORGANIC SPINNING MASSES WITH COLORED POLYCYCLIC AROMATIC HYDROCARBONS OR HALOGEN HYDROCARBONS
Hans Altermatt, Basel, Switzerland, assignor to Ciba Limited, Basel, Switzerland, a Swiss firm
No Drawing. Filed June 11, 1959, Ser. No. 819,573
Claims priority, application Switzerland June 11, 1958
4 Claims. (Cl. 260—37)

The dyeing of high melting organic substances in the mass, for example, superpolyamides, polyethylene terephthalates or polyethylenes, places such high demands on the coloring matter used with regard to thermostability that inorganic pigments have mainly been used for this purpose. However, inorganic pigments have a low coloring strength, and the colored fibers produced therewith have rather dull tints. Attempts have therefore been made to use organic pigments instead of inorganic pigments. However, only very few organic dyestuffs are known that do not decompose at the temperatures at which the aforesaid substances melt, for example, copper phthalocyanine and chlorinated copper phthalocyanines.

Accordingly, the present invention constitutes a valuable advance in the art in that it is based on the observation that polycyclic aromatic compounds that are free from carbonyl groups and groups imparting solubility in water are excellently suited for dyeing high melting spinning masses of all kinds for example, superpolyamides, especially those obtained from adipic acid and hexamethylene diamine or from ε-caprolactam or ω-aminoundecanic acid, or polyethylene terephthalates or polyethylene. Of special interest for use in the process of this invention are polycyclic aromatic hydrocarbons which contain at least four condensed rings of which at least three are benzene rings. In addition to benzene rings the dyestuffs may contain 5-membered carboxycylic rings. They may be substituted, for example, by halogen atoms or amino, alkyl or alkoxy groups. There are given below a few examples of compounds suitable for used in the process of this invention. Beneath the name of each dyestuff is given in brackets the colors of the material dyed therewith.

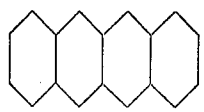

Tetracene (orange)

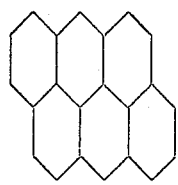

Anthanthrene (golden yellow)

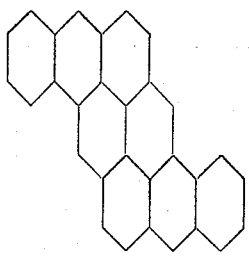

Pyranthrene (reddish brown)

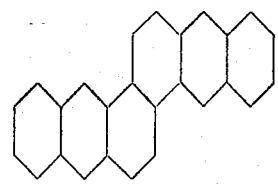

Anthraceno-anthracene (yellow)

Perylene
(yellow)

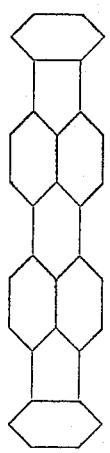

Periflanthene (red)

 

Violanthrene    Isoviolanthrene (red-brown)    (dark red-brown)

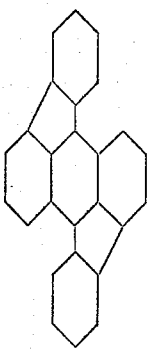

Rubicene (orange)

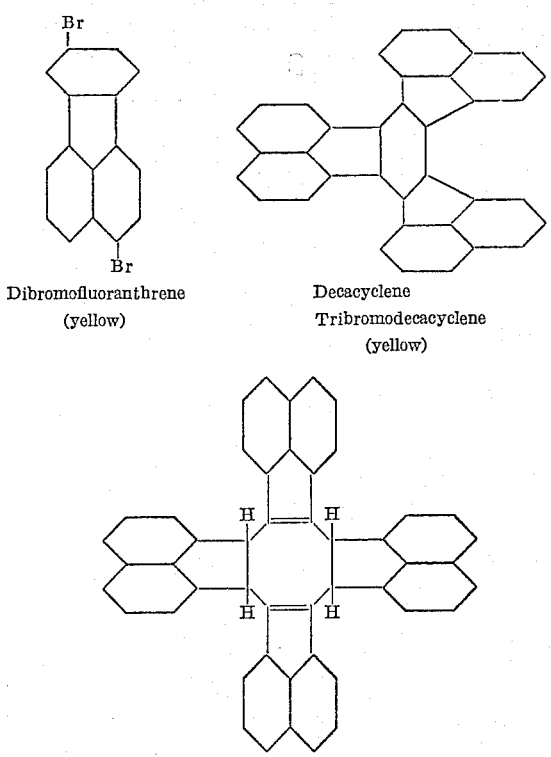

Dibromofluoranthrene (yellow)

Decacyclene
Tribromodecacyclene (yellow)

The above compounds are all known and can be made by known methods.

The substance to be dyed is advantageously mixed in the form of powder, granules or chippings with the dry dyestuff powder by a mechanical method in which the surfaces of the particles of the substance to be dyed are coated with a layer of the dyestuff powder. The dyestuff is advantageously in a finely divided form.

The particles of the plastic thus coated with powdered dyestuff are then melted and spun in known manner or shaped in some other way, for example, to form sheets. The artificial plastics may also be dyed by adding the dyestuff before, during or just at the end of the process of polycondensing the monomers. The dyed substance so obtained is then shaped in the same way as undyed material, by itself or in admixture with another dyed or undyed substance.

The dyestuffs used in the process of this invention are also suitable for dyeing organic substances of high molecular weight which are spun in solution in a solvent, for example, cellulose esters, viscose or polyacrylonitrile. In the latter case the dyestuff pigment is advantageously added in the form of a fine aqueous dispersion to the viscose spinning composition.

The dyeing obtained by the process of this invention, especially those produced with rubicene or periflanthene, are distinguished by their high purity and excellent fastness to light.

The following examples illustrate the invention, the parts and percentages being by weight:

*Example 1*

99 parts of the polyamide obtained from hexamethylene diamine and adipic acid, in the form of chippings, are coated in the dry state with 1 part of very finely divided rubicene. The coated chippings are spun in the usual manner, for example, by the grid spinning method, at about 290–295° C. The filaments so obtained are dyed a brilliant orange tint, and the dyeing has excellent properties of wet fastness and fastness to light.

Instead of the aforesaid polyamide there may be used with the same success a polyamide obtained from ε-caprolactam or from ω-amino-undecanic acid.

By using periflanthene, instead of rubicene, there are obtained red colored polyamide filaments having the same good properties of fastness.

*Example 2*

99 parts of polyethylene terephthalate chippings are coated in the dry state with 1 part of very finely powdered rubicene. The coated chippings are melted in the usual manner at about 285° C. and spun in the molten state. In this manner there are obtained polyester filaments which are dyed a brilliant orange tint and of which the dyeing possesses excellent properties of fastness. By using periflanthene, instead of rubicene, red colored fibers are obtained.

*Example 3*

99 parts of polyethylene chippings are mixed in the dry state with 1 part of very finely powdered rubicene. By injection moulding at 180° C. shaped objects are obtained having a bright orange color, of which the dyeing has excellent properties of fastness.

By using periflanthene, instead of rubicene, moulded objects having a beautiful red tint are obtained.

*Example 4*

99 parts of a polyamide obtained from hexamethylene diamine as described in Example 1 are dyed with one of the hydrocarbons named in column I of the following table. By spinning the colored polyamide there are obtained filaments having the tints given in column II.

| I Hydrocarbon | II Dyeing |
| --- | --- |
| Tetracene | orange. |
| Anthanthrene | golden yellow. |
| Pyranthrene | reddish brown. |
| Anthracenoanthracene | yellow. |
| Perylene | Do. |
| Violanthrene | red-brown. |
| Isoviolanthrene | dark red-brown. |
| Dibromofluoranthrene | yellow. |
| Decacyclene | Do. |
| Tribromodecacyclene | Do. |
| Fluorocyclene | greenish yellow. |

It is to be understood that the proportion of the polycyclic aromatic compound used in conjunction with the fiber-forming mass may vary widely according to the color depth desired, and according to the strength of the color of the coloring material itself. Thus for 1000 parts of the fiber-forming mass, 0.1 part of the polycyclic aromatic compound may be sufficient for appreciably changing the appearance of the finished article, whereas 50 parts are normally not exceeded. It is to be understood too that the fiber-forming mass may contain further ingredients not interfering with the formation of fibers, for example additions of delustering agents such as white pigments (titanium oxide) or additions otherwise desirable in the spinning mass.

What is claimed is:

1. As a composition of matter, a minor portion of rubicene in combination with a high-melting fiber-forming mass of a member selected from the group consisting of
   (1) fiber-forming superpolyamide of aliphatic diamine and dicarboxylic acid, and
   (2) fiber-forming superpolyamide of ω-amino aliphatic carboxylic acid.

2. As a composition of matter, a minor portion of periflanthene in combination with a high-melting fiber-forming mass of a member selected from the group consisting of
   (1) fiber-forming superpolyamide of aliphatic diamine and dicarboxylic acid, and
   (2) fiber-forming superpolyamide of ω-amino aliphatic carboxylic acid.

3. As a composition of matter, a high-melting fiber-forming mass containing predominantly polyethylene terephthalate and a minor proportion of rubicene.

4. As a composition of matter, a high-melting fiber-forming mass containing predominantly polyethylene terephthalate and a minor proportion of periflanthene.

References Cited in the file of this patent

UNITED STATES PATENTS

| | | |
|---|---|---|
| 2,011,789 | Wulff et al. | Aug. 20, 1935 |
| 2,145,905 | Weinmayer | Feb. 7, 1939 |
| 2,198,967 | Hopf et al. | Apr. 30, 1940 |
| 2,345,533 | Graves | Mar. 28, 1944 |
| 2,380,488 | Argyle | July 31, 1945 |
| 2,749,321 | Ham | June 5, 1956 |
| 2,809,116 | Laskowski | Oct. 8, 1957 |
| 2,905,686 | Eckert et al. | Sept. 22, 1959 |

OTHER REFERENCES

Tucker: 50 Chemical Reviews, 483–538 (1952). (See pages 524 and 525, 527 and 528.)